US005560959A

United States Patent [19]
Shimoda et al.

[11] Patent Number: 5,560,959
[45] Date of Patent: Oct. 1, 1996

[54] PROCESS FOR PRODUCING A MULTI-LAYER FILM

[75] Inventors: Hiroshi Shimoda; Noriyuki Yoshihara; Hiroyuki Watanabe; Kaori Yoshida, all of Yokohama, Japan; Jean-Louis Bravet, Thourotte; Michel Moncheaux, Compiegne, both of France

[73] Assignees: Asahi Glass Company Ltd., Tokyo, Japan; Saint Gobain Vitrage, Courbevoie, France

[21] Appl. No.: 566,478

[22] Filed: Dec. 4, 1995

Related U.S. Application Data

[63] Continuation of Ser. No. 279,103, Jul. 22, 1994, abandoned.

[30] Foreign Application Priority Data

Jul. 23, 1993 [JP] Japan .................. 5-202925

[51] Int. Cl.$^6$ ............... B05D 5/06; B05D 1/38; B32B 31/12; B32B 31/20
[52] U.S. Cl. .............. 427/163.1; 156/105; 156/106; 427/208.2; 427/164; 427/407.2; 427/412.1
[58] Field of Search ............... 427/163, 164, 427/412.1, 208.2, 208.8, 163.1, 407.2; 156/106, 105, 330.9, 285

[56] References Cited

U.S. PATENT DOCUMENTS

| | | | |
|---|---|---|---|
| Re. 34,523 | 1/1994 | Daudé et al. ............... | 156/99 |
| Re. 34,538 | 2/1994 | Agethen et al. ............ | 156/106 |
| 3,806,387 | 4/1974 | Peetz et al. . | |
| 4,331,736 | 5/1982 | Schäfer et al. ............ | 264/203 |
| 4,563,395 | 1/1986 | Gillner et al. ............ | 428/423.3 |
| 4,643,944 | 2/1987 | Agetheu et al. ............ | 427/177 |
| 4,683,171 | 7/1987 | Kuga et al. ............ | 427/164 |
| 4,741,961 | 5/1988 | Frisch et al. ............ | 428/412 |
| 4,749,586 | 6/1988 | Bravet et al. ............ | 427/164 |
| 4,784,916 | 11/1988 | Bravet et al. ............ | 156/106 |
| 4,812,359 | 3/1989 | Hall ............ | 156/105 |
| 4,824,926 | 4/1989 | O'Dwyer et al. ............ | 528/65 |
| 4,871,579 | 10/1989 | Bravet et al. ............ | 427/426 |
| 4,894,282 | 1/1990 | LeGrand et al. ............ | 156/106 |
| 4,944,822 | 7/1990 | Ishikawa et al. ............ | 156/285 |
| 5,069,734 | 12/1991 | Kavanagh et al. ............ | 156/106 |
| 5,141,783 | 8/1992 | Corsi et al. ............ | 427/164 |
| 5,268,136 | 12/1993 | Girard et al. . | |
| 5,352,528 | 10/1994 | L'Her et al. ............ | 156/106 |
| 5,474,804 | 12/1995 | Shimoda et al. ............ | 427/412.3 |

FOREIGN PATENT DOCUMENTS

| | | |
|---|---|---|
| 856398 | 1/1978 | Belgium . |
| 0133112 | 2/1985 | European Pat. Off. . |
| 0287861 | 10/1988 | European Pat. Off. . |
| 0430769 | 6/1991 | European Pat. Off. . |
| 0451030 | 10/1991 | European Pat. Off. . |
| 2577934 | 8/1986 | France . |
| 2579610 | 10/1986 | France . |

*Primary Examiner*—Diana Dudash
*Attorney, Agent, or Firm*—Oblon, Spivak, McClelland, Maier & Neustadt, P.C.

[57] ABSTRACT

A process for producing a multi-layer film having a plurality of synthetic resin layers laminated on a releasable flat substrate by casting, which comprises firstly forming on the substrate a synthetic resin layer having adhesive or sticking properties, and then casting and curing on the synthetic resin layer having adhesive or sticking properties at least one kind of reaction-curable resin raw material mixture substantially free from a solvent to form at least one cured synthetic resin layer, so that the uppermost layer is composed of a cured synthetic resin superior in surface properties to its adjacent layer. Further, surface defects transferred from the substrate to the adhesive layer are substantially eliminated by a subsequent lamination step.

10 Claims, 2 Drawing Sheets

PROCESS FOR PRODUCING A MULTI-LAYER FILM

This application is a continuation of application Ser. No. 08/279,103 filed on Jul. 22, 1994 now abandoned The present invention relates to a process for producing a transparent multi-layer film of high optical quality which is useful as laminated on a transparent resin sheet or a glass, sheet primarily to improve the safety.

Heretofore, processes for producing a multi-layer film by casting unreacted liquid starting materials on a substrate, have been proposed as disclosed in Japanese Unexamined Patent Publications No. 162618/1981 and No. 59815/1982 and U.S. Pat. Nos. 4,935,264 and 5,084,325. In these processes, the multi-layer film is laminated on a glass sheet or a transparent resin sheet by coating an adhesive or sticking agent on the side opposite to the side which is in contact with the substrate. Accordingly, if fine defects such as scratch marks are present on the substrate surface, such defects will be transferred to the film surface and form defects for the optical quality of the laminated product. Therefore, the substrate is required to have an excellent optical quality as well as flatness, and it is common to employ a glass or a linear polyester film of high quality as the substrate. However, in the case of the glass sheet, continuous film forming is impossible, and in the case of the linear polyester film, it has been difficult to completely eliminate fine defects from the film surface.

It is an object of the present invention to provide a process for producing a multi-layer film, whereby the conventional problem such that the optical quality is deteriorated by the transfer of the defects of the substrate to the film surface, is solved, and to provide such a method, whereby continuous film-forming is possible.

The present invention is directed to the following invention which makes continuous film-forming possible by using a film as the substrate and which at the same time is capable of overcoming the problem of fine defects on the substrate surface by a buffering effect of a synthetic resin layer having adhesive or sticking properties (hereafter referred to as an adhesive/sticking layer) at the time of lamination and thus is capable of producing a multi-layer film having a substantially superior optical quality.

Namely, the present invention provides a process for producing a multi-layer film having a plurality of synthetic resin layers laminated on a releasable flat substrate by casting, which comprises firstly forming on the substrate a synthetic resin layer having adhesive or sticking properties, and then casting and curing on the synthetic resin layer having adhesive or sticking properties at least one kind of reaction-curable resin raw material mixture substantially free from a solvent to form at least one cured synthetic resin layer, so that the uppermost layer is composed of a cured synthetic resin superior in surface properties to its adjacent layer.

Figure 1:
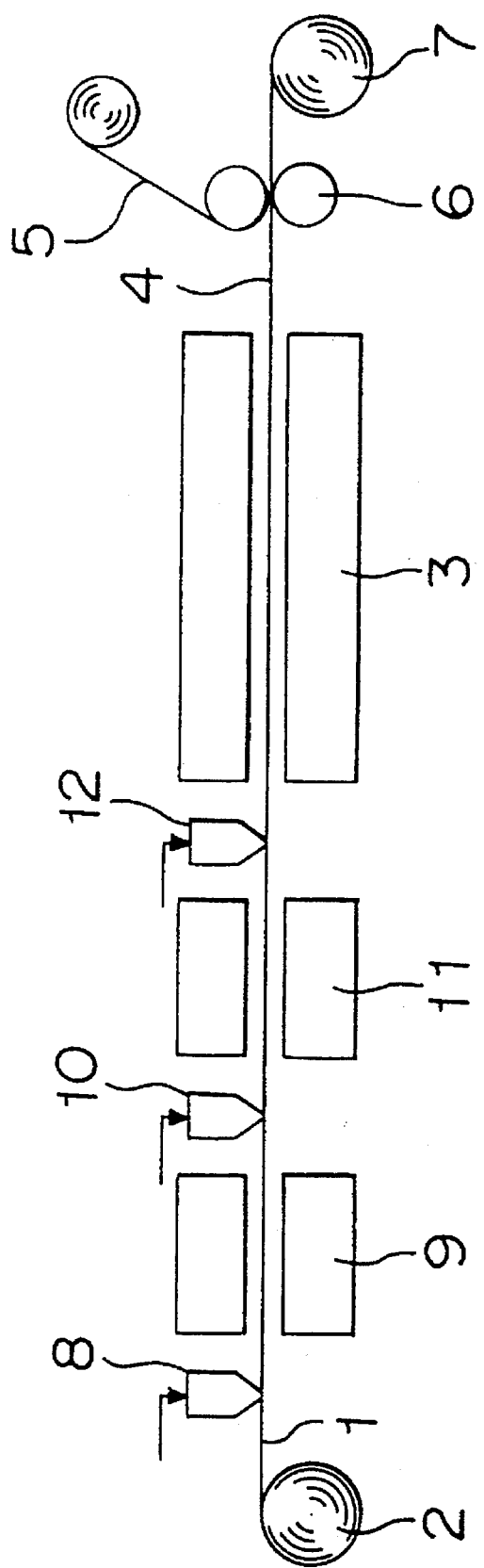
FIG. 1 is a flow diagram of the process.

Now, the present invention will be described in detail with reference to the preferred embodiments.

The present invention is particularly suitable for the production of a multi-layer film having at least two cured synthetic resin layers wherein reaction-curable resin raw material mixtures are reacted and cured. Here, the lowermost adhesive/sticking layer may or may not be a cured synthetic resin layer. In the former case, the multi-layer film has at least two synthetic resin layers, and in the latter case, the multi-layer film has at least three synthetic resin layers. Irrespective of whether or not the adhesive/sticking layer is a cured synthetic resin layer, it is preferred to employ the following process for producing a multi-layer film as the process for forming at least two cured synthetic resin layers by casting.

In a process for producing a multi-layer film having a plurality of synthetic resin layers laminated on a releasable flat substrate by casting, firstly, a synthetic resin layer having adhesive or sticking properties, is formed on the substrate, and then at least two types of reaction-curable resin raw material mixtures substantially free from a solvent are sequentially cast and cured on the synthetic resin layers having adhesive sticking properties, to form at least two cured synthetic resin layers, so that the uppermost cured synthetic resin layer is composed of a cured synthetic resin superior in surface properties to its adjacent inner cured synthetic resin layer.

In a process which comprises casting synthetic resin raw materials in a liquid state on a substrate, followed by drying or curing by reaction for solidification, the surface state of the substrate will be transferred to the film. Accordingly, it is indispensable to employ a substrate of high quality free from surface defects in order to obtain a film having a high optical quality. However, in a case where the substrate is a film suitable for a continuous process, it has fine irregularities which cause haze, and during the process for its production, fine scratch marks are likely to form, or foreign matters are likely to deposit on the surface during the process for the production of a multi-layer film. Such defects of the substrate film or foreign matters deposited during the production process will be transferred to the resulting multi-layer film and will constitute defects of the multi-layer film, and they will remain as defects even when the multi-layer film is laminated on a base material to form a final product.

Whereas, in the process for producing a multi-layer film according to the present invention, such surface defects of the film substrate will be transferred to the adhesive/sticking layer. By its functional nature, a sticking layer constitutes a very soft layer. Accordingly, when a multi-layer film employing such a soft sticking layer is laminated on another base material, the sticking layer readily yields under pressure for lamination so that the transferred defects will be smoothed out and will be substantially eliminated.

Also in the case of an adhesive layer, defects will be eliminated under the laminating pressure in the same manner as in the case of the sticking layer, so long as it is made of a resin which is soft at room temperature. Further, even in a case of a thermoplastic resin or a thermosetting resin which does not deform at room temperature, if it is a resin which can be softened and deformed under heating, it is possible to smooth out and substantially eliminate the transferred defects by employing a means of pressing under heating in the step of laminating on another base material, and thus it is possible to obtain a laminate having an excellent optical quality.

In the present invention, casting is a method of forming a film-shaped product by casting and solidifying synthetic resin raw materials having fluidity on a substrate. When the synthetic resin raw materials have a medium such as a solvent, as in the case of a synthetic resin solution, a solidified synthetic resin can be obtained by removing such a medium by e.g. drying. In the case of a compound which is capable of forming a synthetic resin by reaction or a mixture of two or more compounds which are mutually reactive to form a synthetic resin, it can be solidified by the curing reaction. If the reaction-curable raw materials have fluidity themselves, they may directly be used for casting, or they may be used in the form of a mixture with a medium such as a solvent. If such reaction-curable raw materials do not have fluidity by themselves, they may be mixed with a medium to gain fluidity.

In the present invention, reaction-curable resin raw material mixtures to be used for forming the inner layers and the uppermost layer, are substantially free from a medium such as a solvent which is required to be removed in casting. This is required particularly when a relatively thick synthetic resin layer is to be formed. However, such a restriction is not required in a case where the adhesive/sticking layer is relatively thin. The reaction-curable resin raw material mixtures are preferably those which are capable of forming polyurethane resins, because reaction-curable resin material mixtures capable of forming polyurethane resins usually have fluidity, and synthetic resins having various excellent physical properties can be obtained by proper combination of raw material compounds. As other reaction-curable resin raw material mixtures, acrylic resin raw material mixtures of various acrylates or metaacrylates may, for example, be mentioned. Unless otherwise specifically mentioned, the reaction-curable resin raw material mixtures are those capable of forming polyurethane resins.

Among cured synthetic resins formed by the reaction-curable resin raw material mixtures, the cured synthetic resin constituting the uppermost layer is required to be a synthetic resin having excellent surface properties, since the surface of this layer will be the exposed surface in the final use. It is partially preferred that this cured synthetic resin is a synthetic resin having a self-healing property. As a synthetic resin having such a surface property, a crosslinked polyurethane resin is most preferred.

The multi-layer film obtained by the present invention may be the one composed of two layers comprising the adhesive/sticking layer and the above-mentioned uppermost layer, wherein the adhesive/sticking layer may be a thin layer. However, it preferably has at least one synthetic resin layer having excellent strength. Such a synthetic resin layer of high strength may be an adhesive/sticking layer or an inner layer formed between the adhesive/sticking layer and the uppermost layer. A synthetic resin layer of high strength is required to be a thick layer to some extent. Accordingly, this layer is preferably composed of a cured synthetic resin formed from a reaction-curable resin raw material mixture.

A preferred multi-layer film obtained by the present invention is a multi-layer film having a three layer structure comprising a relatively thin adhesive/sticking layer, an inner layer made of a synthetic resin of high strength and an uppermost layer made of a synthetic resin excellent in the surface properties. Here, the adhesive/sticking layer is preferably a layer obtained by coating or casting a solution or dispersion of e.g. a thermoplastic resin or a solution of a reaction-curable resin raw material mixture, preliminarily prepared, followed by drying to remove the solvent or the dispersant. As the inner layer, only one layer is usually sufficient, but one or more additional layers may be further provided as inner layers.

Now, the present invention will be described in further detail with respect to the process for producing a multi-layer film having a three layer structure comprising an adhesive/sticking layer, an inner layer and an uppermost layer of a synthetic resin.

Referring to the flow diagram shown in FIG. 1, an embodiment of the process of the present invention will be described. FIG. 1 is a flow diagram of a process wherein a multi-layer film having a three layer structure is continuously formed. A film substrate 1 having release-treatment applied, is sent out from a substrate roll 2, and an adhesive/sticking layer, an inner layer and an uppermost layer are sequentially formed thereon in this order as will be described hereinafter, whereupon reaction-curable resin raw material mixtures are adequately reacted and cured in a heating oven 3 to form a multi-layer film 4 on the substrate 1. Then, a protective sheet 5 is laminated on the multi-layer film 4 by a laminating roll 6, and the laminated product is wound up by a roll 7. Each of the above-mentioned layers is cast in a liquid state on the substrate 1. Accordingly, the film substrate is supported at its lower side by rollers to be horizontal and a tension is exerted in the width direction by tenter rollers disposed along both sides, so that it is kept flat and smooth.

Figure 2:
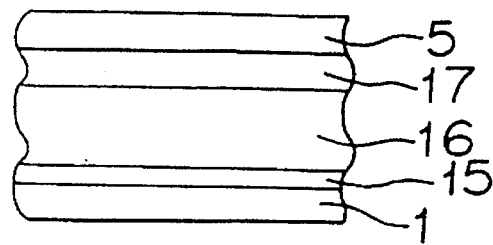
FIG. 2 is a cross-sectional view of a laminate during its winding operation.

Firstly, an adhesive/sticking layer is formed on the film substrate 1. This is accomplished by casting a solution of a fusion-bondable thermoplastic resin from a nozzle 8 for coating an adhesive/sticking layer, followed by drying in a drying oven 9 to form an adhesive/sticking layer. Then, to form an inner layer on the adhesive/sticking layer, a reaction-curable resin raw material mixture is ejected and cast from a first ejection nozzle 10. Then, the cast reaction-curable resin raw material mixture is heated in a heating oven 11 to let the reaction proceed to such an extent that the mixture loses its fluidity but its surface still retains stickiness. Then, a reaction-curable resin raw material mixture for forming an uppermost layer is further ejected and cast from a second ejection nozzle 12 on the surface of this partially cured reaction-curable resin raw material mixture. Thereafter, the above two reaction-curable resin raw material mixtures are thoroughly reacted and cured in an oven 3. The cross-section of the obtained laminate is shown in FIG. 2. This laminate comprises a multi-layer film 4 having a three layer structure comprising the adhesive/sticking layer 15, the cured synthetic resin inner layer 16 and the cured resin uppermost layer 17, a film substrate 1 adjacent to the adhesive/sticking layer, and a protective sheet 5 adjacent to the uppermost laye 17.

Figure 3:
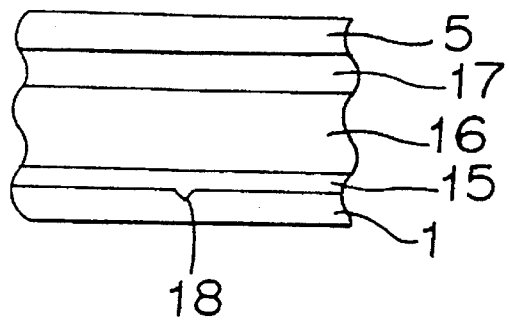
FIG. 3 is a cross-sectional view of a laminate during its winding operation in a case where a substrate having a defect is used.
Figure 4:
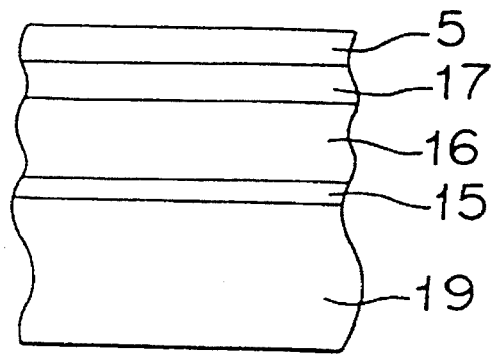
FIG. 4 is a cross-sectional view of a laminate showing a model in which the defect has been eliminated by lamination on a base material.

FIGS. 3 and 4 show cross-sectional views of laminates to illustrate the effect of the present invention. If a defect 18 such as a scratch mark or a dent is present on the surface of the film substrate 1 (FIG. 3), such a defect will be transferred to the adhesive/sticking layer 15 of the multi-layer film 4. However, when this multi-layer film 4 is peeled off from the film substrate 1 and then laminated on a hard base material 19 such as a glass sheet (FIG. 4), such a defect will be smoothed out and will be substantially eliminated by deformation of the adhesive/sticking layer 15, if necessary, by heating or pressing.

Now, details of the above method described with reference FIGS. 1 to 4, modifications of the method and details of the raw materials will be further described.

As a means for forming the adhesive/sticking layer, a system may be employed in which a solution or dispersion of an adhesive or sticking agent is coated by means Of a die or a roll. Otherwise, coating may be carried out by means of a spray. After coating, the coated layer is reacted or cured, or solidified by evaporation of a solvent, in an oven. If the adhesive or sticking agent is in a liquid state, it may be coated by itself without using a solvent. Otherwise, it is possible to employ a reaction-curable resin raw material mixture capable of forming an adhesive or sticking polyurethane resin, or its solution, may be employed. As mentioned above, the adhesive/sticking layer is a relatively thin layer, and it can be coated in a solution state. It is particularly preferred to employ a solution of a synthetic resin having thermoplasiticity.

The thickness of the adhesive/sticking layer is preferably from 3 to 50 μm. If the thickness is less than 3 μm, the ability to eliminate defects tends to be inadequate, and at the same time, the adhesive/sticking strength tends to be unstable. On the other hand, if it exceeds 50 μm, an optical quality of the adhesive/sticking layer itself tends to be low, and consequently the overall optical quality of the multi-layer film tends to be low.

The adhesive or sticking agent may, for example, be a resin prepared by using an acrylic resin or a polyurethane resin as a base material, such as a polyurethane resin obtained by using acrylic polyol or acrylated alkyd polyol and non-yellowing polyisocyanate, a silicone-modified acrylate resin or a thermoplastic polyurethane resin obtained by using a polyester diol, a chain extender and non-yellowing diisocyanate. It may, for example, be an adhesive/sticking agent of e.g. thermoplastic type, non-crosslinkable type, one-pack crosslinkable type, two-pack crosslinkable type or type. However, the adhesive or sticking agent is not limited to such specific examples, and any such agent may be useful so long as it is a resin deformable under pressure or heating during the lamination with the base material and it has an adhesive/sticking function. Particularly preferred is a polyurethane resin obtainable by using non-yellowing polyisocyanate, which is excellent in the weather resistance and which has thermoplasticity.

The reaction-curable resin raw material mixture for forming a synthetic resin of the inner layer or the uppermost layer is a mixture containing no medium such as solvent and having fluidity. The one capable of forming a polyurethane resin is a mixture containing, as the main components, two types of main raw materials for polyurethane i.e. an active hydrogen compound having at least two functional groups (active hydrogen-containing groups) reactive with isocyanate groups, such as a polyol, and a polyisocyanate. It usually contains additives such as a catalyst and a leveling agent. The leveling agent is an additive which improves fluidity of raw material mixture by improving the wettability and suppressing dewetting, and it has a surface activity in many cases. For example, a fluorine-type surfactant, a fluorine-type surface modifier, a silicone-type surfactant and various diorganopolysiloxane compounds may be employed. Particularly preferred is, for example, a compound having a long chain perfluoroalkyl group, or a polydiorganosiloxane-polyester (or polyether) block copolymer having a polyester chain or a polyether chain. Further, if necessary, an ultraviolet absorber, an antioxidant, a light stabilizer, a coloring agent and other additives may optionally be incorporated.

The reaction-curable resin raw material mixture prepared by mixing the above described raw materials, is required to be ejected from the ejection nozzle before the fluidity is lost by the progress of the reaction after the preparation. The ejected raw material mixture is cast on the surface of the lower layer to form a layer having a uniform thickness and a smooth surface, and the reaction progresses simultaneously. If the reaction proceeds too quickly, the mixture loses its fluidity before it is adequately cast, such being undesirable. In a case where the reaction is too slow at room temperature, it is preferred to accelerate the reaction in a heated atmosphere. The degree of curing by reaction depends on the heating temperature and the heating time.

There is no particular limitation as to the conditions under which the raw material mixture for an inner layer is cast and then a raw material mixture for the upper layer is cast thereon. For example, it is possible to cast the raw material mixture for the uppermost layer after the raw material mixture for the inner layer has adequately been reacted and cured. Otherwise, it is possible to cast the raw material mixture for the uppermost layer before the raw material mixture for the inner layer has been adequately reacted and cured. It is effective to cast the raw material mixture for the uppermost layer when the surface of the raw material mixture for the inner layer still retains stickiness to some extent, so that mixing takes place at the interface and at the same time, a reaction takes place depending upon the compositions of the raw materials, whereby there will be an effect that the adhesive strength between the two layers will be very high. The fact that it is unnecessary to completely cure the raw material mixture for the inner layer, means that the heating or heating time required for the curing may be unnecessary or may be little, whereby the efficiency for the production of the multi-layer film will be improved. Accordingly, it is also preferred that the raw material mixture for the uppermost layer is cast after the raw material mixture for the inner layer has reacted and cured sufficiently to such an extent that stickiness of the surface of the raw material mixture of the inner layer is lost.

Since, no adequate curing of the raw material mixture for the inner layer is required, it is not essential to heat the raw material mixture in the oven 11 as shown in FIG. 1. Otherwise, the mixture may be heated in the oven 11 until it is adequately cured. The reaction and curing conditions such as the heating temperature and the time in the oven 3 are not particularly limited and may vary depending upon the type of the raw material mixture. In a case where a multi-layer film having a polyurethane resin layer is to be produced, it is common to employ curing conditions of e.g. from 120° to 180° C. for from 0.2 to 2 hours.

After casting, the reaction-curable resin raw material mixture is sufficiently reacted and cured to form a multi-layer film on the substrate. The exposed uppermost layer surface is preferably protected by a protective film as shown in FIG. 1 to prevent contamination with dirt and dust. However, use of such a protective film is not essential. The substrate is preferably in the form of a flat film or sheet suitable for continuous production. However, it may be a single glass sheet or a plurality of glass sheets arranged in a continuous series. Preferably, a continuous film of a synthetic resin is employed. Particularly preferred is a continuous film of a linear polyester such as polyethylene terephthalate. The substrate is preliminarily treated with a release agent such as a diorganopolysiloxane compound before use. In the case of a releasable film made of an adhesive material such as a fluorine resin, no treatment with such a release agent is required. Like the protective film, the substrate usually protects the surface of the multi-layer film, until the laminated film is finally used. However, it may be peeled off at any optional stage after the production of the multi-layer film.

The thickness of the cured synthetic resin layer formed by curing the reaction-curable resin raw material mixture, is not particularly limited. However, the thickness of the inner layer is usually from 200 to 3000 μm, preferably from 400 to 1500 μm. If the inner layer is thinner than this, the mechanical strength tends to be inadequate, and if it is thicker than this, such is not economically advantageous. The thickness of the uppermost layer is usually from 20 to 500 μm, preferably from 50 to 300 μm. If the uppermost layer is thinner than this range, the surface properties (particularly the self-healing property) tend to be inadequate, and if it is thicker than this range, such is not advantageous from the economical viewpoint. The total thickness of the multi-layer film is particularly preferably from 400 to 500 μm.

Conventional materials may be used as the materials for the adhesive/sticking layer, the inner layer and the uppermost layer. For example, as such materials useful for the production of laminated safety glass, materials disclosed in e.g. Japanese Examined Patent Publications No. 270507/1982, No. 60989/1987, No. 60990/1987, No. 8791/1988, No. 31361/1988, No. 51922/1990, No. 9186/1991 and No. 52774/1992 and Japanese Unexamined Patent Publications No 71213/1985, No. 71252/1985, No. 71253/1985, No. 138671/1986, No. 138672/1986, No. 177241/1986, No. 56715/1989, No. 56716/1989, No. 56717/1989 and No. 79530/1990, may be employed.

The multi-layer film obtained by the present invention is suitable for the production of a laminated safety window material by laminating it on one side of a transparent resin sheet as disclosed in the above publications. However, the use is not particularly limited to such a specific application, and it may be used for other applications. The multi-layer film obtained by the present invention is preferably colorless or colored and transparent. However, in a case where fine irregularities are formed on the surface of the adhesive/sticking layer surface, the decrease in the transparency by such irregularities is not a problem, because such irregularities will disappear when the multi-layer film is laminated on e.g. a glass sheet.

Now, the present invention will be described in further detail with reference to Examples and Comparative Examples. However, it should be understood that the present invention is by no means restricted by such specific Examples. In the following Examples, "parts" or "pbw" means "parts by weight".

EXAMPLE 1

A solution containing 8 wt % of a thermoplastic polyurethane resin was ejected from a nozzle onto a continuous substrate (a 100 μm thick linear polyester coated with a silicone release agent) running at a constant speed. The cast solution was dried at 50° C. in an oven to form a 5 μm thick adhesive layer on the substrate.

Onto the adhesive layer was cast a mixture of polyurethane raw materials of the following formulation.

| Polyol component | |
|---|---|
| Poly(ε-caprolactone)diol* | 50.93 pbw |
| (* having a hydroxyl value of 90.8) | |
| Poly(1,6-hemanecarbonate)diol* | 16.2 pbw |
| (* having a hydroxyl value of 57.5) | |
| Polycarbonate diol* | 16.2 pbw |
| (* having a hydroxyl value of 128.6, prepared from 1,6-hexanediol and cyclohexanedimethanol) 1,4-Butanediol | 7.41 pbw |
| *Isocyanate component | |
| Methylenebis(4-isocyanatecyaclohexane)* | 99.17 pbw |
| (* hydrogenated MDI) | |
| Fluorine-based leveling agent* | 0.83 pbw |
| (* "Surflon S-381") | |
| Dibutyltin dilaurate | $6.5 \times 10^{-5}$ pbw |
| Ratio of polyol to isocyanate | 100/44.54 by weight |

The cast mixture (900 μm thick) was heated at 150° C. for 5 minutes in an oven to accelerate the reaction and increase the viscosity. Thus there was formed an inner layer.

Onto the inner layer was cast a mixture of polyurethane raw materials of the following formulation.

| Polyol component | |
|---|---|
| Poly(ε-caprolactone)triol* | 50.0 pbw |
| (* having a hydroxyl value of 196.4) | |
| Poly(ε-caprolactone)triol* | 40.0 pbw |
| (* having a hydroxyl value of 540.3) | |
| Poly(ε-caprolactone)diol* | 3.08 pbw |
| (* having a hydroxyl value of 37.6) | |
| Silicone-based leveling agent | 6.92 pbw |
| Isocyanate component | |
| Cyanurate-modified hexamethylene diisocyanate | 90.0 pbw |
| Isophorone diisocyanate | 5.0 pbw |
| Hydrogenated MDI | 5.0 pbw |
| Dibutyltin dilaurate | 0.06 pbw |
| Ratio of polyol to isocyanate | 100/90.41 by weight |

The cast mixture (150 μm thick) was heated together with the inner layer at 150° C. for 40 minutes in an oven to cure the two layers.

The surface of the multi-layer film was covered with a protective film (25 μm thick polyester film). The resulting product was wound up into a roll.

With the substrate and protective film removed, there was obtained a three layer film composed of a layer of thermoplastic polyurethane resin, an inner layer of linear polyurethane having high mechanical strength, and a self-healing uppermost layer of crosslinked polyurethane.

The three layer film was laminated to a 3 mm thick glass sheet, with the adhesive layer facing to the glass sheet, by pressing at 10 kg/cm² with heating at 140° C. for 2 hours. Thus, there was obtained a transparent laminate composed of a glass sheet and a multi-layer film. It hardly scattered light when placed in front of a mercury lamp.

Incidentally, the silicone-based leveling agent mentioned above is a yellowish waxy substance which is obtained by reaction alcohol-modified silicone having a hydroxyl value of about 550 ("BY 16-036" from Toray-Dow Corning Co., Ltd.), (ε-caprolactone)diol having a molecular weight of about 800, and adipic acid in a molar ratio of 1/2/2 at 100° C. for 30 minutes, at 150° C. for 30 minutes, and at 190°–195° C. for 1 hour, followed by evacuation from normal pressure to 5 mmHg over 1 hour at 190°–195° C. and dehydration for 1 hour at the same temperature and pressure.

COMPARATIVE EXAMPLE 1

A 5 μm thick adhesive layer was formed on a polypropylene film from the same solution of a thermoplastic polyurethane resin as used in Example 1. A double-layer film was formed separately on the same substrate as used in Example 1 by casting, followed by heating in an oven, from the same materials as used in Example 1. (The first layer, 150 μm thick, corresponds to the uppermost layer in Example 1, and the second layer, 900 μm thick, corresponds to the inner layer in Example 1). The adhesive layer was laminated to the double-layer film, and the resulting laminate was wound up into a roll. The laminate had the same structure as the multi-layer film in Example 1. It was composed of a substrate, a layer of crosslinked polyurethane, a layer of linear polyurethane, a layer of thermoplastic polyurethane resin, and a polypropylene film which functions as a protective film.

The resulting multi-layer film was laminated to a 3 mm thick glass sheet, with the adhesive layer facing to the glass sheet, by pressing at 10 kg/cm² with heating at 140° C. for 2 hours. Thus, there was obtained a transparent laminate composed of a glass sheet and a multi-layer film. It considerably scattered light when placed in front of a mercury lamp. The light scattering was due to the minute surface irregularities transferred to the second layer from the polyester film as the substrate.

EXAMPLE 2

A multi-layer film and a glass laminate thereof were prepared in the same manner as in Example 1, except that the polyester film as, the substrate was coated with a silicone-based release agent using a roll coater. The polyester film has good surface smoothness with little light scattering, but it is liable to shallow scratching (10–20 mm long) because of poor slipping properties (due to the absence of surface irregularities). The resulting glass laminate hardly scattered light when placed in front of a fluorescent lamp.

COMPARATIVE EXAMPLE 2

The same procedure as in Comparative Example 1 was repeated except that the substrate was replaced by the same heavily scratched polyester film as used in Example 2. The resulting glass laminate scattered light when placed in front of a fluorescent lamp, owing to the defects on the crosslinked polyurethane layer which were transferred from the polyester film (substrate).

The process of the present invention obviates the necessity of using, as a substrate, an expensive film of excellent optical quality in the production of a multi-layer film to be laminated to a transparent base material. This contributes to the reduction of production cost.

Further, even when foreign matters are deposited on the substrate or scratch marks are formed on the substrate during the process for producing the multi-layer film, such defects can be eliminated. This substantially improves the yield and contributes to the reduction of production cost.

We claim:

1. A process for producing a laminated object comprising a base material and a multi-layer film having a plurality of synthetic resin layers laminated thereon, which comprises firstly forming on a releasable flat substrate containing surface defects, a synthetic resin layer having adhesive properties, and then casting and curing on the synthetic resin layer having adhesive properties at least one kind of reaction-curable resin raw material mixture substantially free from a solvent to form at least one cured synthetic resin layer, wherein the last formed layer is composed of a cured synthetic resin superior in self-healing surface properties to its adjacent layer, and wherein the surface of the multi-layer film so produced adjacent the substrate contains surface defects transferred from said substrate, removing the multi-layer film from the substrate, and then laminating the film to the base material, with the surface of the film containing surface defects adjacent the base material, and wherein the laminating includes applying heat and pressure to smooth out and substantially eliminate said surface defects.

2. The process according to claim 1, wherein at least two kinds of reaction-curable resin raw material mixtures substantially free from a solvent are sequentially cast and cured on the synthetic resin layer having adhesive properties to form at least two cured synthetic resin layers.

3. The process according to claim 1 or 2, wherein the synthetic resin layer having adhesive properties is a layer made of a thermoplastic resin.

4. The process according to claim 3, wherein the synthetic resin layer having adhesive properties, is a layer of a thermoplastic resin formed by casting and curing a reaction-curable resin raw material mixture substantially free from a solvent.

5. The process according to claim 3, wherein a solution or dispersion of the thermoplastic resin is cast on the releasable flat substrate to form the thermoplastic resin layer having adhesive properties.

6. The process according to claim 5, wherein the thermoplastic resin is a thermoplastic polyurethane resin.

7. The process according to claim 2, wherein in the casting of said reaction-curable resin raw material mixtures, before a first reaction-curable resin raw material mixture already cast, is completely cured by reaction, a second reaction-curable resin raw material mixture is cast thereon, and then both mixtures are completely cured by reaction.

8. The process according to claim 2, wherein each of said at least two kinds of reaction-curable resin raw material mixtures is a reaction-curable resin raw material mixture which is curable by reaction to form a polyurethane resin, and the reaction-curable resin raw material mixture for the last formed layer is a reaction-curable resin raw material mixture which is capable of forming a crosslinked polyurethane resin.

9. The process according to claim 2, wherein the multi-layer film is continuously produced by carrying out the casting of the plurality of synthetic resin layers on a continuously moving substrate.

10. The process according to claim 1 or claim 2, wherein the synthetic resin layer having adhesive properties is a thermoplastic resin layer with a thickness of from 3 to 50 µm and is formed on a continuously moving substrate, and wherein two cured synthetic resin layers are formed, and wherein the second reaction-curable resin raw material mixture is cast before the first reaction-curable resin raw material mixture is completely cured by a reaction, and wherein the first and second reaction curable resin raw material mixtures are simultaneously completely cured by reaction to form two layers comprising a first, inner, linear polyurethane resin layer having a thickness of from 400 to 1500 µm and a second, outer, crosslinked polyurethane resin layer having a thickness of from 50 to 300 µm.

* * * * *